Figure 1:
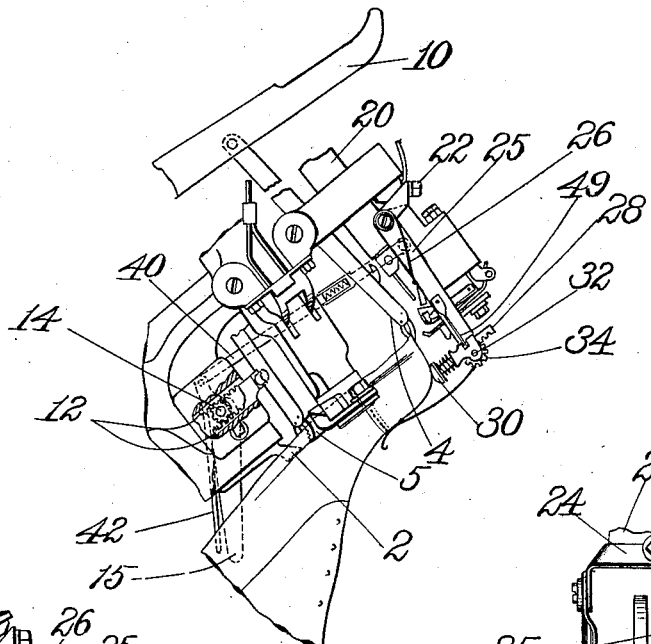

A. PERRI.
MACHINE FOR USE IN THE MANUFACTURE OF BOOTS AND SHOES.
APPLICATION FILED APR. 16, 1909.

1,024,019.

Patented Apr. 23, 1912.

WITNESSES.
Edith C. Holbrook
Elizabeth C. Coupe

INVENTOR.
Angelo Perri
By his Attorney,
Nelson W. Howard

UNITED STATES PATENT OFFICE.

ANGELO PERRI, OF HAVERHILL, MASSACHUSETTS, ASSIGNOR TO UNITED SHOE MACHINERY COMPANY, OF PATERSON, NEW JERSEY, A CORPORATION OF NEW JERSEY.

MACHINE FOR USE IN THE MANUFACTURE OF BOOTS AND SHOES.

1,024,019.      Specification of Letters Patent.      Patented Apr. 23, 1912.

Application filed April 16, 1909. Serial No. 490,216.

*To all whom it may concern:*

Be it known that I, ANGELO PERRI, a citizen of the United States, residing at Haverhill, in the county of Essex and State of Massachusetts, have invented certain Improvements in Machines for Use in the Manufacture of Boots and Shoes, of which the following description, in connection with the accompanying drawings, is a specification, like reference characters on the drawings indicating like parts in the several figures.

This invention relates to machines for use in making shoes and particularly to machines for working an upper over a last and has for its object to provide novel means for assisting the operator in correctly positioning the upper upon the last, and more particularly to provide means in a pulling-over or other machine for measuring the length of the tip of a shoe or determining the position of the tip seam or tip line.

The invention is shown herein as applied to a machine of the type shown in British Patent No. 12305/03, although the invention is applicable to other types of pulling-over machines and also to lasting machines.

The prior practice has been for an operator to use a suitably graduated measuring instrument which was not connected with the machine and had to be picked up from the bench at the time it was to be used, manually applied to the shoe, held in position while it was being used, and then laid aside in some place where it could be readily found again when it was required for use. This procedure involved, a considerable loss of time and frequently the measuring device was not employed when it should be and as a result the shoe tips were frequently not correctly adjusted.

An important feature of this invention consists in providing a tip measure operatively connected with the machine and normally occupying a position removed from the shoe but capable of being readily shifted into an operative relation for indicatng the position of the tip of the last. This feature of the invention is embodied in a construction in which the tip measure is attached to a support already present in the machine and is normally held in an out of the way position where it does not interfere with the normal operation of the machine or the usual manipulations of the shoe in presenting it to the machine. Means is provided for moving the tip measuring means from its inoperative position into an operative position when the operator desires to examine the position of the upper on the last.

According to a further feature of this invention the means for moving the tip measure into operative position is associated with the means by which adjustment of the upper is effected so that the operator with one hand and by substantially a single movement such as he is accustomed to making can first move the tip measure into position where it will indicate the position of the tip seam and then, while continuing to hold the measure in indicating position, he can effect adjustment of the upper. To this end a lost-motion connection is provided between the tip measure and a lever mounted adjacent to the usual tip straightening lever whereby both levers can be grasped by one hand of the operator and the one connected with the tip measuring device can be first actuated.

A further feature of the invention consists in the construction and arrangement of the tip measuring instrument which comprises a feeler adapted to be moved through the hand lever above mentioned into engagement with the toe end of the shoe and then to slide with relation to the carrier through which it is actuated and by such sliding movement to project a graduated plate into a position extending across the tip line.

In the embodiment of the invention herein shown the feeler is mounted on one end of a rack bar which slides in the carrier and this sliding movement takes place against the tension of a spring which insures a firm contact of the feeler with the toe end of the last. The rack bar operates through a pinion to move the graduated plate from an upright position against its support through an angle of approximately 270° into a horizontal position under and against the tip of the shoe. There is means provided for limiting the movement of the carrier toward the feeler—that is, the relative sliding movement of the feeler and carrier—whereby they are always moved to a predetermined position so that the graduated plate shall occupy a definite lengthwise position with relation to the feeler. After this position has been reached the yielding, lost-motion connection between the operating hand lever and the carrier permits further movement of said lever and will permit that lever to accompany the tip straightening lever in the movements which may be given to the latter for adjusting the upper on the last.

These features of the invention and others, including certain combinations of parts and more important details of construction, will be explained in connection with the following description of the apparatus in which the invention is embodied and will then be pointed out in the claims at the end of the description.

Figure 3:
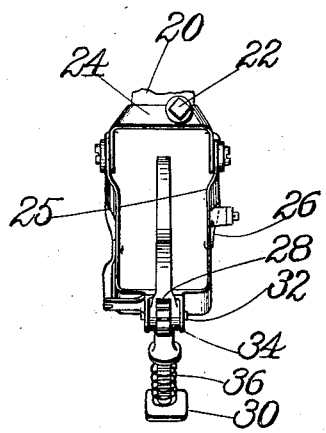
Figure 2:
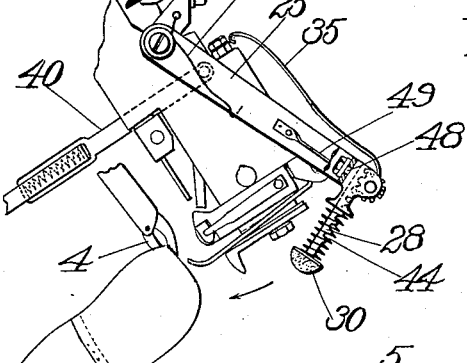
Figure 4:
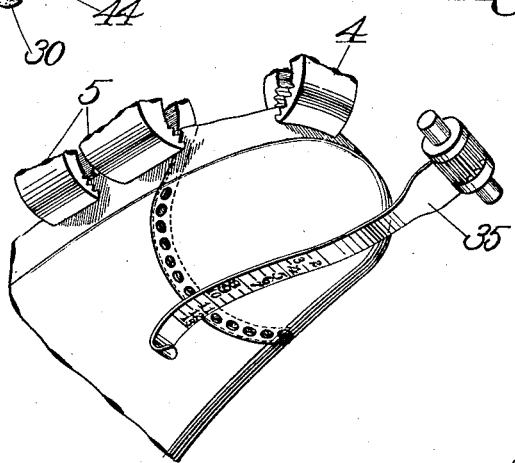

Figure 1 is a side elevation of so much of a pulling-over machine equipped with this invention as appears to be necessary for explaining the invention, the tip measuring devices being in their operative position. Fig. 2 is a similar view showing the tip measuring devices in an inoperative position. Fig. 3 is a front view of the tip measuring devices. Fig. 4 is a perspective view on a larger scale showing more clearly the relation occupied by the graduated plate for indicating the length of the shoe tip.

As will be understood from the patent referred to, the machine comprises a bottom rest 2 against which the shoe is presented bottom upwardly, and toe and side grippers 4 and 5 which seize the upper and pull it snugly about the fore part of the last, after which the machine comes to rest to permit the operator to inspect the shoe and make any adjustments of the upper with relation to the last which may be required for properly positioning the upper with its several lines in correct relation to the last. The toe gripper which holds the upper lengthwise of the last is operated by a lever provided at the front end with a handle 10 by which said toe gripper can be uplifted for pulling the upper farther forward or can be depressed for relaxing the tension on the upper. By this movement of the toe gripper the position of the tip line or seam with relation to the length of the shoe can be shifted. Each of the side grippers has a rearwardly projecting rack bar 12. These bars are arranged on opposite sides of a toothed shaft 14 to which is connected a hand lever 15. Movement of this lever in one direction effects movement of one side gripper forwardly and the other side gripper rearwardly as will be readily understood for adjusting the upper lengthwise about the last and thereby straightening or angularly adjusting the tip seam with relation to the last. These parts are fully explained in said prior patent and require no further description here.

20 indicates a depending arm of the machine upon which is fastened, by a bolt 22, a plate 24 having backwardly bent end portions upon which are pivoted the two side bars of a yoke 25 which constitutes the carrier for the tip measuring devices. Springs 26 normally hold this yoke or carrier in the position shown in Fig. 2 with the measuring instrumentalities retracted from the shoe so that they are not in the way of introducing the shoe or operating upon the shoe. The carrier 25 is provided in its lower end with a guideway for a rack bar 28 on the front of which is a pad 30 constituting the feeler adapted to be forced against the toe end of the shoe as shown in Fig. 1. The lower end of the carrier 25 also supports a shaft 32 carrying a pinion 34. To this shaft and pinion is fastened a plate 35, preferably of resilient metal, shaped to lie against the shoe tip and preferably of a length to extend backwardly across the tip seam, as shown best in Fig. 4. The plate 35 is provided with graduations against which are marked characters indicating the normal lengths of tips for the different sizes of shoes. A spring 36 is arranged between the feeler 30 and the carrier 25 to hold the feeler normally projected backwardly, as shown in Fig. 2.

A link 40 made in two parts yieldingly connected, as shown in Figs. 1 and 2, to permit a limited degree of extension or lost motion is connected to the carrier and extends backwardly to the upper arm of a lever 42 which is pivoted on the shaft 14 and positioned directly in the rear of the hand lever 15 where it may be grasped by the same hand of the operator as that which engages the lever 15 and operated in advance of the lever 15 to position the tip measure against the shoe before the lever 15 is actuated for effecting adjustment of the upper by the side grippers. A stop 44 on the rack bar 28 serves to limit the approach of the carrier 25 to the shoe and after such approach is stopped, further movement of the hand lever 42 is taken up by the lost motion in the link 40. The stop serves to determine the relation of the feeler to the front or right-hand end of the measuring plate when the latter is in operative position. The feeler and graduated blade may be connected to the carrier indirectly as shown in the drawings by a block swiveled on the carrier at 48 and held in normal position by a spring 49. This permits the feeler to adapt its position automatically to different formations of the shoe or last and to project the blade under the last in a position substantially perpendicular to the tip seam or line on crooked right and left lasts.

The manner in which the illustrated embodiment of this invention is to be used has been made clear in the description of the apparatus and I claim as new and desire to secure by Letters Patent of the United States:

1. A pulling-over machine, having in combination, automatically operating means for pulling an upper over a last, having provision for a pause to permit inspection of the pulled shoe, and means adapted to be moved at the will of the operator into position to indicate the length of the shoe tip.

2. A pulling-over machine, having in combination, automatically operated means for pulling over an upper, additional means to adjust the upper about the last, and manually controlled means for measuring the tip.

3. A pulling-over machine, having in combination, automatically controlled means for pulling over an upper, and tip measuring means usually occupying in the machine an inoperative position remote from the shoe and movable manually into operative position after the operation of the pulling-over means.

4. A pulling-over machine, having in combination, mechanism for pulling-over an upper, additional means for effecting adjustment of the upper, and means associated with the adjusting means to indicate the length of the shoe tip.

5. A shoe tip measuring device comprising members for engaging the toe end of the shoe and for overlying the tip of the shoe in substantially the median line of the shoe, which members are movable together into and out of engagement with the shoe and are relatively movable in the use of the device angularly into and out of operative relation to one another.

6. A machine of the class described, having in combination, means for pulling an upper lengthwise of a last, and a tip gage operatively free from the pulling means and arranged substantially centrally of the shoe in position to measure from the toe end backwardly across the tip line.

7. A machine of the class described, having in combination, means for pulling an upper lengthwise of a last, and a tip gage movable from and toward an operative position contacting with the toe end of the shoe and extending backwardly across the tip line.

8. A machine of the class described, having in combination, means for pulling an upper lengthwise of a last, and a tip gage adapted to engage the toe end of the shoe and extend backwardly across the tip line, and means for moving said gage from and toward operative position.

9. A machine of the class described, having in combination, means for pulling an upper lengthwise of a last, and a tip measure adapted to be made to contact with the toe end of the shoe and extend backwardly across the tip line, and means for moving the tip measure forwardly and upwardly into an inoperative position remote from the shoe.

10. A machine of the class described, having in combination, means for pulling an upper lengthwise of a last, and a tip position indicator comprising a feeler operatively supported in the machine and movable to and from positions to contact with an edge face of the shoe, and a member adapted to be positioned by said feeler to indicate the relation of the tip to the last.

11. A machine of the class described, having in combination, means for pulling an upper lengthwise of a last, a carrier movable toward and from the shoe, a feeler movably mounted in the carrier arranged to engage an edge face of the shoe, and an indicator operatively connected with the feeler to be positioned thereby to show the relation of the tip to the last.

12. A machine of the class described, having in combination, means for pulling an upper lengthwise of a last, a carrier movable toward and from the shoe, a feeler slidingly mounted in the carrier arranged to be forced against the toe end of the shoe, and an indicator operatively connected with said sliding feeler to be projected thereby into operative relation to the shoe after the feeler has engaged the shoe.

13. A machine of the class described, having in combination, means for pulling an upper lengthwise of a last, and a tip measurer comprising a swinging carrier, a feeler slidingly mounted in the carrier, and a measuring plate arranged to be turned by the movement of the feeler from an inoperative position into a position where it extends backwardly across the tip line.

14. A machine of the class described, having in combination, means for pulling an upper lengthwise of a last, and a tip measurer comprising a swinging carrier, a feeler slidingly mounted in the carrier, and a measuring plate arranged to be turned by the movement of the feeler from an inoperative position into a position where it extends backwardly across the tip line, and manually controlled means to actuate the said parts to do their work.

15. A machine of the class described, having in combination, means for pulling an upper lengthwise of a last, and a tip measurer comprising a swinging carrier, a feeler slidingly mounted in the carrier, and a measuring plate arranged to be turned by the movement of the feeler from an inoperative position into a position where it extends backwardly across the tip line, manually controlled means to actuate the said parts to do their work, and means for automatically restoring the said parts to a position away from the shoe.

16. A machine of the class described, having in combination, means for pulling an upper over a last, means for measuring the length of the tip from the toe end of the last backwardly to the tip seam, and means for thereafter effecting adjustment of the upper.

17. A machine of the class described, having in combination, means for pulling an upper over a last, means for measuring the length of the tip from the toe end of the last backwardly to the tip seam, additional means for effecting adjustment of the upper, and means arranged to be operated in advance of said adjusting means to place the measuring means in operative relation to the shoe.

18. A machine of the class described, having in combination, means for pulling an upper over a last, means for measuring the length of the tip from the toe end of the last backwardly to the tip seam, a hand lever for use in adjusting the upper on the last, a second lever arranged relatively to the first lever to be operated in advance of the adjustment for positioning the measuring means in operative relation to the shoe.

19. A machine of the class described, having in combination, means for pulling an upper over a last, a swinging frame, a sliding feeler, a measuring device, a pinion connecting said feeler and device, a lever to adjust the upper, and a second lever connected with the swinging frame and arranged to be actuated by the same hand of the operator and in advance of the first lever.

20. A machine of the class described, having in combination, means for pulling an upper over a last, a tip measure, a lever to effect adjustment of the upper, a second lever to position the tip measure, a lost motion connection between the second lever and the measure arranged to permit the measure to be positioned during the first part of the movement of the second lever and to remain in operative position during further movement of the second lever in company with the first lever.

21. A machine of the class described, having in combination, tip straightening mechanism and means adapted to be positioned in time relation with the actuation of said mechanism to indicate the position of the tip on the last.

22. A machine of the class described, having in combination, tip straightening mechanism and tip position indicating means arranged to be operatively positioned as an incident to the actuation of the straightening mechanism.

23. A machine of the class described, having in combination, tip straightening mechanism and tip position indicating means arranged to be operatively positioned as an incident to the actuation of the straightening mechanism, and means for automatically restoring the indicating means to an inoperative position.

24. A machine of the class described, having in combination, tip straightening mechanism, tip position indicating means and connected devices for actuating said mechanism and means.

25. In a machine of the class described, tip position indicating means comprising a carrier and a feeler and an indicating blade swiveled on the carrier to permit movement to adapt the position of the latter parts to different shoes.

26. A shoe making machine comprising shoe resting means, a feeler and a measuring blade movably connected therewith to be actuated thereby into operative relation to the work.

27. A shoe making machine comprising a feeler and a swinging blade connected with the feeler to be moved thereby from an inoperative into an operative relation to the work.

28. A shoe making machine comprising shoe resting means, a frame mounted to move toward and from the shoe, a tip measurer carried by the frame, and means connected with said measurer and arranged to be operated by contact with the shoe for moving the measurer into operative position.

29. A machine of the class described having, in combination, means for pulling an upper over a last, means for measuring the length of the tip, and means for moving the upper longitudinally of the last to straighten the tip line.

30. A machine of the class described having, in combination, means for holding an upper in pulled over relation to a last, means for measuring the length of the tip from the toe end of the last back to the tip line, and means for moving the upper relatively to the last to adjust the position of the tip line.

31. A machine of the class described having, in combination, means for holding an upper in pulled over relation to a last, a tip measurer normally occupying an inoperative position, manual means for moving the tip measurer into operative position, and means for thereafter effecting adjustment of the upper.

32. A machine of the class described having, in combination, means for holding an upper in pulled over relation to a last, a movable frame carrying a tip gage and normally occupying a position remote from the last, means for moving said frame toward the last, and a device operated by contact with the shoe for swinging the tip gage into measuring position.

33. A machine of the class described having, in combination, means for holding an upper in pulled over relation to a last, means for positioning a tip gage centrally of the shoe in position to measure from the toe backwardly to the tip line, and means to shift the upper in opposite directions longitudinally of the last.

34. A machine of the class described comprising shoe supporting means, pulling over means, a tip measurer, and means operated by contact with the shoe to move the measurer into measuring position.

35. A machine of the class described comprising shoe supporting means, a tip measurer, means operated by contact with the shoe to move the tip measurer into measuring position, and other means to move the same out of measuring position.

36. A machine of the class described comprising shoe supporting means, a tip measurer, means operated by contact with the shoe to move the tip measurer into measuring position and yielding means to move the same out of measuring position.

In testimony whereof I have signed my name to this specification in the presence of two subscribing witnesses.

ANGELO PERRI.

Witnesses:
A. BELLE HOPKINSON,
J. FRANK BATCHELDER.

---

Copies of this patent may be obtained for five cents each, by addressing the "Commissioner of Patents, Washington, D. C."